United States Patent
Chergui

(10) Patent No.: US 10,583,516 B2
(45) Date of Patent: Mar. 10, 2020

(54) MULTI-STAGE RESISTANCE WELDING OF SANDWICH-TYPE METAL SHEETS

(71) Applicants: ThyssenKrupp Steel Europe AG, Duisburg (DE); ThyssenKrupp AG, Essen (DE)

(72) Inventor: Azeddine Chergui, Dortmund (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 432 days.

(21) Appl. No.: 15/035,383

(22) PCT Filed: Nov. 5, 2014

(86) PCT No.: PCT/EP2014/002955
§ 371 (c)(1),
(2) Date: May 9, 2016

(87) PCT Pub. No.: WO2015/070959
PCT Pub. Date: May 21, 2015

(65) Prior Publication Data
US 2016/0288241 A1    Oct. 6, 2016

(30) Foreign Application Priority Data
Nov. 12, 2013  (DE) .................. 10 2013 112 436

(51) Int. Cl.
*B23K 11/11* (2006.01)
*B23K 11/16* (2006.01)
(Continued)

(52) U.S. Cl.
CPC ............... *B23K 11/11* (2013.01); *B23K 11/00* (2013.01); *B23K 11/16* (2013.01); *B23K 11/34* (2013.01)

(58) Field of Classification Search
CPC ......... B23K 11/00; B23K 11/11; B23K 11/16; B23K 11/34; B23K 11/002
(Continued)

(56) References Cited

U.S. PATENT DOCUMENTS 4,072,843 A * 2/1978 Szabo .................. B23K 11/163
219/91.1
4,122,325 A * 10/1978 Featherstone .......... B23K 9/235
219/86.1
(Continued)

FOREIGN PATENT DOCUMENTS

CA        2834744 A1    11/2012
CN      101274387 A    10/2008
(Continued)

OTHER PUBLICATIONS

International Search Report for PCT/EP2014/002955 dated Feb. 24, 2015 (dated Mar. 6, 2015).
(Continued)

*Primary Examiner* — Ibrahime A Abraham
*Assistant Examiner* — Frederick F Calvetti
(74) *Attorney, Agent, or Firm* — Lathrop GPM LLP

(57) ABSTRACT

Sandwich panels may include an intermediate thermoplastic layer disposed between two metallic cover layers. Some methods for welding a sandwich panel to a metallic component may involve heating a region of the sandwich panel with a preheating current so that the thermoplastic layer is softened and by compression of the cover layers is displaced from the welding region. A tack-welding current flowing between first and second welding electrodes may weld the cover layers together, and a welding current may be used to weld the metallic cover layers to the metallic component. In some cases, the first welding electrode may be in contact with one of the metallic cover layers, and the second
(Continued)

welding electrode may be in contact with the metallic component. As a result, the sandwich panel may be joined to the metallic component in a short cycle time without blisters and faults arising in the sandwich component.

12 Claims, 6 Drawing Sheets

(51) Int. Cl.
 *B23K 11/34* (2006.01)
 *B23K 11/00* (2006.01)
(58) Field of Classification Search
 USPC .............................................. 219/91.2, 117.1
 See application file for complete search history.

(56) References Cited

U.S. PATENT DOCUMENTS

| | | | | |
|---|---|---|---|---|
| 4,650,951 | A * | 3/1987 | Koga | B23K 11/163 219/118 |
| 5,866,868 | A * | 2/1999 | Hirane | B23K 11/115 219/110 |
| 8,476,549 | B2 * | 7/2013 | Nakagawa | B23K 11/115 219/78.01 |
| 8,502,105 | B2 * | 8/2013 | Tanaka | B23K 11/115 219/86.22 |
| 10,179,371 | B2 * | 1/2019 | Chergui | B23K 11/0026 |
| 2007/0187469 | A1 * | 8/2007 | Chen | B23K 20/122 228/112.1 |
| 2009/0065484 | A1 * | 3/2009 | Wang | B23K 11/115 219/118 |
| 2011/0188927 | A1 * | 8/2011 | Mizrahi | B23K 11/115 403/271 |
| 2014/0224774 | A1 * | 8/2014 | Chergui | B23K 11/002 219/91.2 |
| 2016/0184919 | A1 * | 6/2016 | Chergui | B23K 11/0026 219/91.21 |
| 2016/0200074 | A1 * | 7/2016 | Lang | B32B 15/08 428/576 |
| 2016/0288241 | A1 * | 10/2016 | Chergui | B23K 11/00 |

FOREIGN PATENT DOCUMENTS

| | | |
|---|---|---|
| CN | 105473268 * | 4/2016 |
| DE | 102011100495 A1 | 11/2012 |
| DE | 102011109708 A1 | 2/2013 |
| DE | 102013108563 A1 | 2/2015 |
| JP | 61115687 * | 6/1986 |
| JP | S61115687 A | 6/1986 |
| JP | S62110878 A | 5/1987 |
| JP | S63264279 A | 11/1988 |
| JP | H01218775 A | 8/1989 |
| WO | 2011017722 A1 | 2/2011 |
| WO | 2013020636 A1 | 2/2013 |

OTHER PUBLICATIONS

English Language Abstract for DE102011109708.
English Language Abstract for DE102013108563.

* cited by examiner

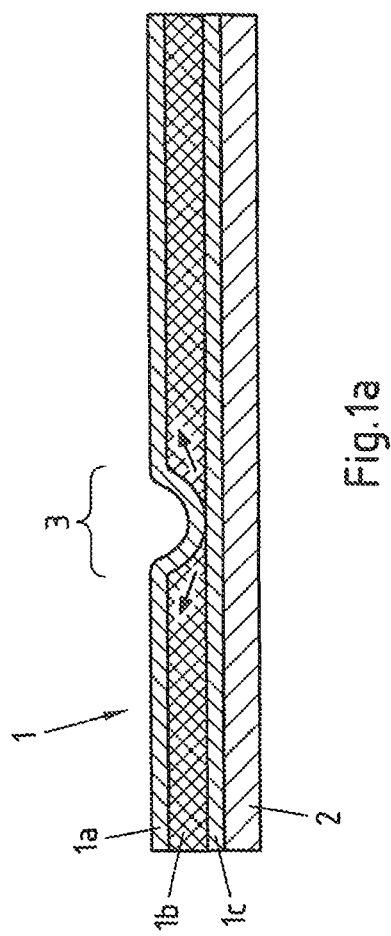
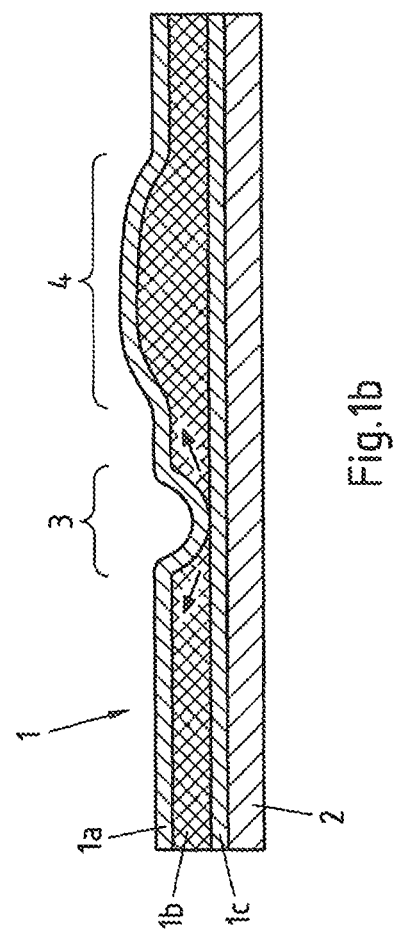

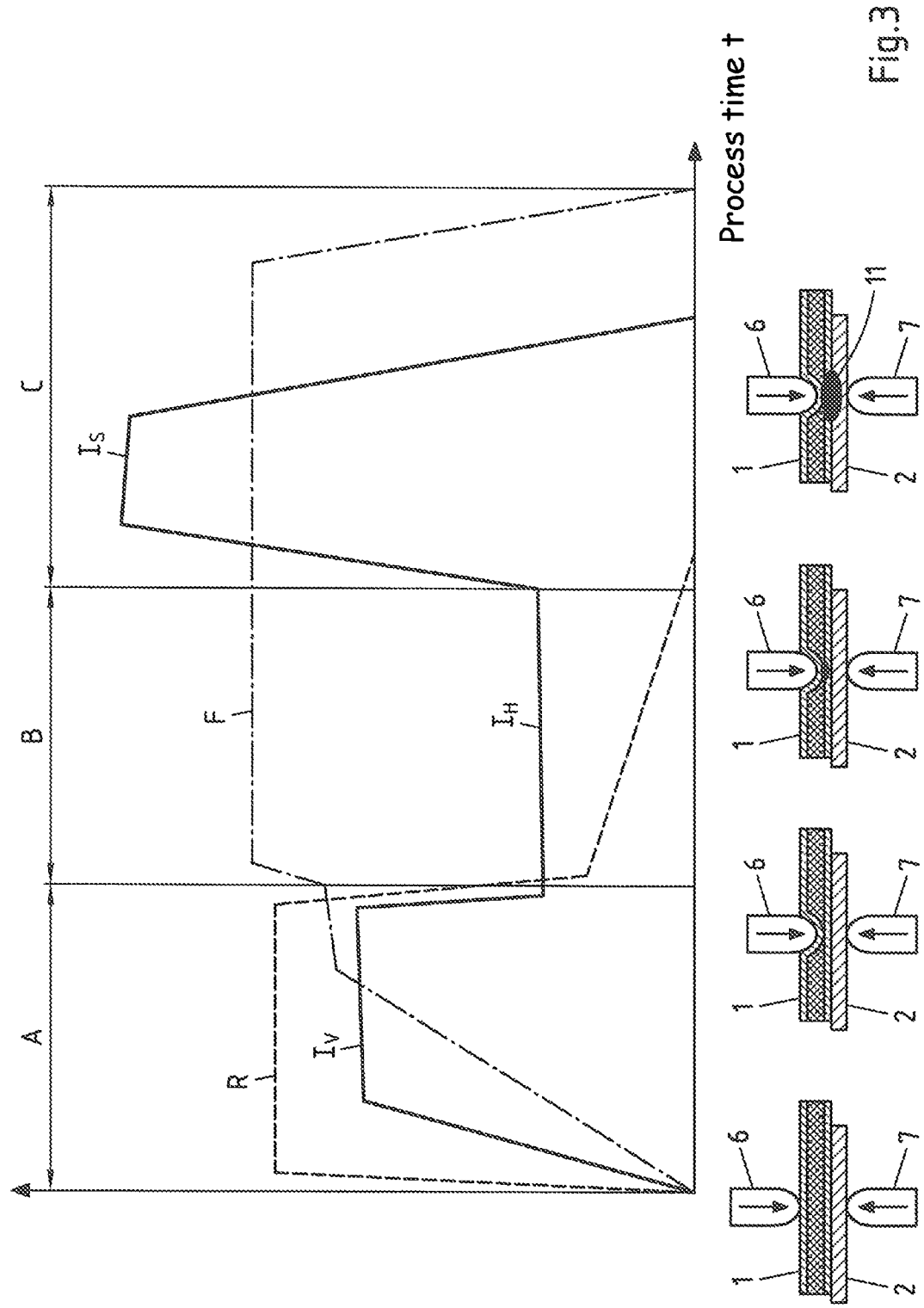

MULTI-STAGE RESISTANCE WELDING OF SANDWICH-TYPE METAL SHEETS

CROSS REFERENCE TO RELATED APPLICATIONS

This application is a U.S. National Stage Entry of International Patent Application Serial Number PCT/EP2014/002955, filed Nov. 5, 2014, which claims priority to German Patent Application No. DE 102013112436.4 filed Nov. 12, 2013, the entire contents of both of which are incorporated herein by reference.

FIELD

The present disclosure relates to methods for resistance welding sandwich-like panels to other metallic components.

BACKGROUND

The increasing demand for lightweight construction concepts in the automotive industry confers prominence on the use of sandwich panels which have a thermoplastic plastics-material layer between two thin metallic cover layers, so as to further increase the potential for weight saving in automotive construction while using sandwich panels. Sandwich panels are manufactured, for example, in the form of strips by laminating a metallic strip with a continuous thermoplastic plastics-material layer and with a further metallic strip, and said sandwich panels are trimmed to form panels. Sandwich panels may provide various mutually exclusive properties which open up new potentials for weight saving. In this way, by virtue of the plastics-material layer, sandwich panels are significantly lighter than solid metallic panels, while at the same time making available high strength values. Moreover, the sandwich panels are sound-damping and offer high rigidity. However, it is disadvantageous in the case of sandwich panels that they have an electrically isolating plastics-material layer which in the case of fusion welding methods causes problems in relation to the configuration of a flawless welded connection. By virtue of lacking suitability for welding, for example for resistance welding to other metallic components, sandwich panels are therefore often adhesively bonded or are joined together by mechanical means.

A method for joining a sandwich panel to a further metallic component is disclosed in the German publication DE 10 2011 109 708 A1, in which the intermediate layer in the connection region is melted and is displaced from the connection region such that a welded connection may be subsequently produced by establishing electrical contact between the component and the cover layers of the sandwich panel. It is proposed that heating of the joint regions is carried out by temperature-controllable electrodes or pressing elements. To this end the welding electrodes or the pressing elements are provided with heating elements, for example. The construction of the welding electrodes thus becomes relatively complex. Moreover, the speed of heating the thermoplastic plastic-material layer may be further increased such that shorter cycle times may be achieved.

Moreover, a method for resistance welding two composite panels using two welding electrodes is disclosed in patent document U.S. Pat. No. 4,650,951, said two welding electrodes being heated and thus heating and displacing the plastics-material layer interposed between the cover layers before actual welding commences.

Moreover, a method in which two current circuits are used in order to connect a sandwich panel to a further metallic component by resistance welding is disclosed in German patent application DE 10 2013 108 563 A1. The method here is divided into two steps, that is to say, on the one hand, into a preheating step in which the region to be welded is heated by way of a preheating current, the thermoplastic plastics-material being displaced from that region of the sandwich panel that is to be welded and, on the other hand, after preheating the sandwich panel is welded to the metallic component by applying a welding current. However, it has been established that in the course of this procedure short circuit may arise during contact between the cover layers while the preheating current is still being applied, on account of which spillings may arise in the sandwich panel which may lead to the formation of blisters or to delamination, respectively.

BRIEF DESCRIPTION OF THE FIGURES

FIG. 1a is a schematic sectional view of an example sandwich panel wherein contact between two metallic cover layers in a region to be welded has already been established.

FIG. 1b is a schematic sectional view of an example sandwich panel that has faults in the form of bulges due to spillings.

FIG. 3 is a chart plotting a preheating current, a tack-welding current, a welding current, an electrical resistance, and a welding force against time during three different time periods of an example method of resistance welding.

DETAILED DESCRIPTION

Figure 2A:
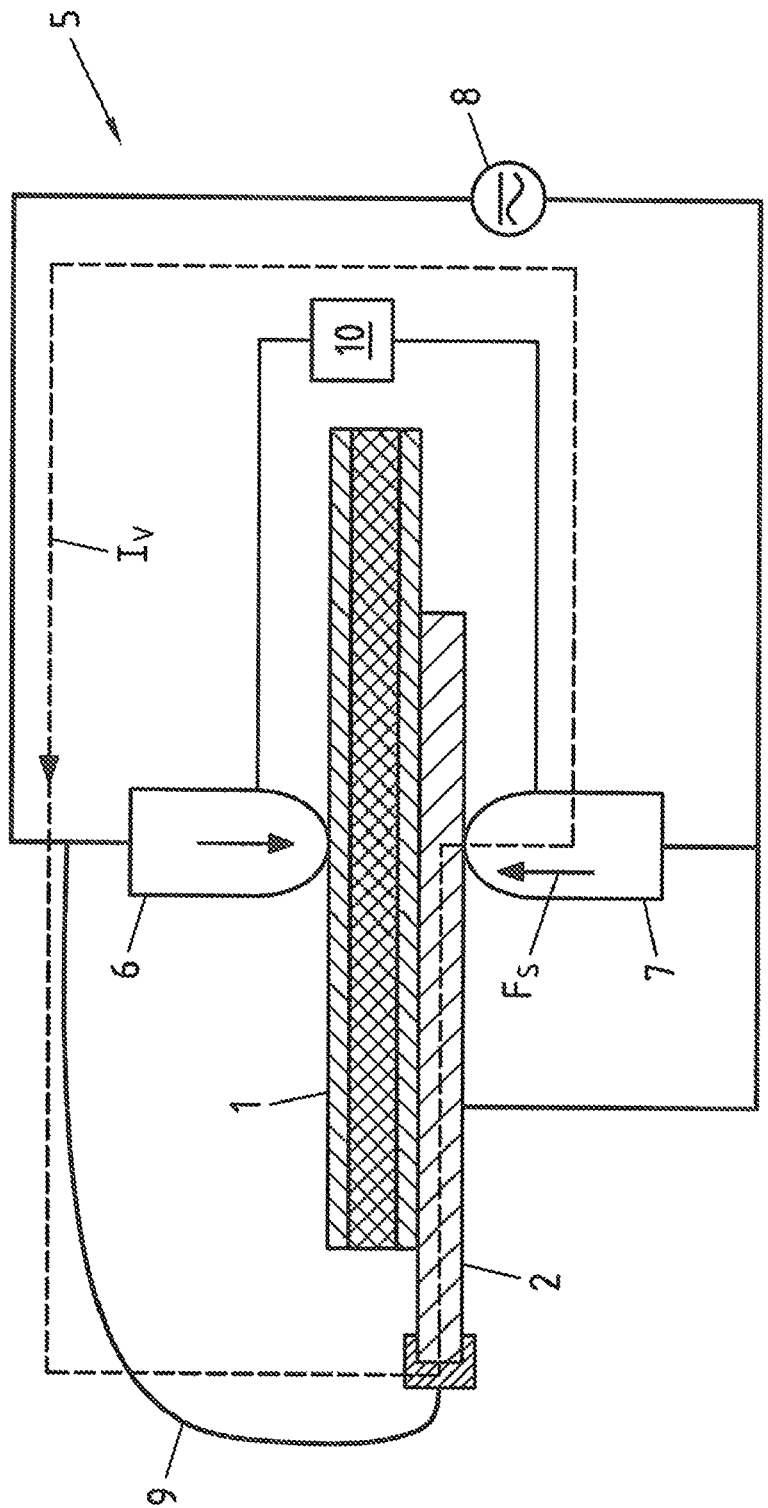
FIG. 2a is a schematic sectional view of an example device for resistance welding a sandwich panel to another metallic component, wherein a heated plastics material is displaced from a region to be welded.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure generally concerns methods for resistance welding sandwich panels to one or more metallic components. In some examples, a sandwich panel may have two metallic cover layers and one intermediate thermoplastic plastics-material layer disposed between the metallic cover layers. At least a region of the sandwich panel to be welded may be heated in such a manner that the intermediate thermoplastic plastics-material layer softens and by compression of the two metallic cover layers is displaced from the welding region. The metallic cover layers and the additional metallic component can be welded together by an electric current flowing by way of a first and a second welding electrode, wherein the first welding electrode may be in contact with a metallic cover layer of the sandwich panel and the second welding electrode may be in contact with the metallic component.

According to the disclosed methods for resistance welding sandwich panels, a sandwich panel may be joined to a further metallic component within a short cycle time without blisters and faults arising in the sandwich component.

Thus in some examples, methods of resistance welding may comprise at least the following steps:

(A) heating that region of the sandwich panel that is to be welded by a preheating current, and displacing the plastics-material between the metallic cover layers of the sandwich panel in the welding region by applying a welding force to the first and second welding electrode such that the metallic cover layers of the sandwich panel are pressed onto one another, (B) generating a tack weld between the metallic cover layers of the sandwich panel, using a tack-welding current between the first and second welding electrode, (C) welding the tack-welded metallic cover layers of the sandwich panel to the component by way of a welding current.

Thereby, according to the teaching of the present invention, the metallic cover layers of the sandwich panel are first connected by a tack weld and subsequently are welded to the metallic component, the creation of spillings which lead to faults in the sandwich component may be effectively prevented. In the case of direct welding, the remnants of plastics-material which still remain on the internal sides of the metallic cover layers upon the displacement of the plastics layer are brought to melt or evaporate within a very short time period. The gases created lead to the formation of blisters or to delamination, respectively. Moreover, on account of the evaporation of coating fractions of the metallic cover layers in the interior of the sandwich panel, spillings may also react with remnants of plastics material such that formation of blisters or delamination, respectively, may arise directly around the connection region. By contrast, the input of energy is kept minor during tack welding such that the metallic cover layers are not completely melted, only the boundary layer between the two metallic cover layers perform a materially integral connection. Since the remainder of the metal is not at melting temperature, the plastics-material in the immediate proximity is not brought up to evaporation temperature such that gentle removal of the remnants of the plastics material between the metallic cover layers is performed prior to and/or during tack welding. The step of welding the metallic cover layers of the sandwich panel to the metallic component may be subsequently performed without any formation of blisters or any delamination arising in adjacent regions of the sandwich panel.

According to a first embodiment of the method, the preheating current flows via a bypass between the first welding electrode and the metallic component to be welded, on account of which it may be prevented that the current is routed directly by way of a cover panel, so as to suppress damage such as delamination between the cover panel and the plastics-material layer as a result of excessive heating, for example.

According to a further embodiment, resistance measuring is performed between the first and second welding electrode such that the preheating current is reduced or switched off in the case of a drop in the electrical resistance between the welding electrodes. By way of resistance measuring between the two welding electrodes it is possible to monitor the process of the displacement of the thermoplastic plastics-material layer from that region in the sandwich panel that is to be welded. As the metallic cover layers of the sandwich panel converge, the electrical resistance between the first and the second welding electrode does indeed rapidly drop, said electrical resistance in the case of the welding force acting on the two welding electrodes further being held constant, in the case of metal-on-metal contact between the two metallic cover layers, dropping more slowly to a minimum. By way of resistance measuring the preheating current may thus be set or switched off by way of a controller, depending on the displacement of the plastics-material from the region that is to be welded.

According to a next embodiment, further improvement of the method is achieved in that upon having reduced the preheating current to a predefined first value, or upon having switched off the preheating current, the two welding electrodes are further converged until the cover panels are in complete contact in the region that is to be connected. A tack-welding current between the metallic cover layers of the sandwich panel is set for generating a tack weld between the first and second welding electrode, the tack-welding current optionally being lower than the welding current. It has been established that further improvement in avoiding spillings and the blisters or delamination, respectively, associated therewith is achieved in the sandwich panel in that the tack-welding current between the first and second welding current is only switched on once the preheating current has already dropped to a predefined value, for example a very low value, or has been completely switched off, the cover panels in the region to be connected being in substantially complete contact. On account thereof, the input of heat into the sandwich panel is better controlled. The tack-welding current is optionally lower than the welding current which is used for welding the metallic cover layers to the metallic component. By way of this measure the region of the mutually contacting metallic cover layers is gently heated, achieving improved capability of controlling tack welding of the metallic cover layers.

The electrical resistance between the first and second welding electrode during preheating and compressing of the welding electrodes preferably drops to a first predefined resistance value such that, upon reaching the predefined first resistance value, the preheating current is reduced or switched off, respectively, so as to prevent short-circuit in the case of complete contact between the cover panels. On account thereof, switching on the tack-welding current may be triggered only when almost no more plastics-material is present between the metallic cover layers, for example.

The tack-welding current is preferably set to the maximum value thereof, using a ramping function. On account thereof it is also achieved that remnants of plastics-material remaining between the metallic cover layers are gently heated and may be removed from the intermediate space between the metallic cover layers by the welding force which is applied by the welding electrodes.

According to a further embodiment of the method, upon reaching a predefined second electrical resistance value between the first and the second welding electrode, a welding current for welding the sandwich panel to the component is set in the first current circuit. As has already been set forth, the electrical resistance value correlates to the amount of plastics-material which is still located between the metallic cover layers. Therefore, the second predefined resistance value may be utilized for setting the proportion of plastics-material remaining between the metallic cover layers in such a manner that the risk of metal spillings during welding of the metallic cover layers to the metallic component the risk of spillings within the sandwich panel is significantly reduced.

According to a further embodiment of the method, the welding current is also set to the maximum value thereof using a ramping function. A ramping function is understood to mean a welding current or a tack-welding current, respectively, which increases over time and which terminates at a maximum value. The latter may be held constant for a specific time period, for example.

In order to reduce the risks of faults in the sandwich panel on account of the speed of the displacement of the thermoplastic plastics-material from that region of the sandwich panel that has to be welded, according to a further embodiment the welding force between the first and the second welding electrode is increased at least until the electrical resistance between the first and the second welding electrode drops. On account thereof, the region of diffluence of the thermoplastic plastics-material and thus the mutual approach of the metallic cover layers are consciously utilized against one another in order to achieve displacement of the thermoplastic plastics-material from the region to the welded that is as gentle as possible.

It has furthermore been established that, according to a further embodiment of the method, it is advantageous for the welding force to be held so as to be constant, as soon as the electrical resistance between the first and the second welding electrode has dropped to a predefined third resistance value. The predefined third resistance value may be lower or higher than the electrical resistance between the welding electrodes at which the tack-welding current is switched on. However, both resistance values may also be identical.

Finally, according to a particularly simple embodiment, the preheating current may also be switched off after a fixed preheating period. For example, the preheating period may be determined in an empirical manner, depending on the preheating current set and on the combination of the respective sandwich panel to be welded and the component to be welded, in that a temporal interval with the preheating current switched on and with an applied welding force, within which the electrical resistance between the first and second welding electrode drops sharply, is empirically determined. The preheating current may then be set such that the drop in resistance is only performed after the preheating current has been switched off, since the drop in resistance sets in with a slight delay on account of the softening of the plastics-material. In principle, it is also possible for the time point of switching on the tack-welding current and/or the welding current to be fixedly set depending on the preheating current being switched off, the time points for switching on being preferably established by empirical welding tests carried out between the component and the sandwich panel. On account thereof, resistance welding may be performed without simultaneous resistance measuring, for example.

First, FIG. 1a), in a schematic sectional view, shows the initial state when welding a sandwich panel 1 which is composed of two metallic cover layers 1a, 1c, and a intermediate thermoplastic plastics-material layer 1b between the two cover layers 1a, 1c. Contact between the metallic cover layers 1a and 1c in the region 3 to be welded has already been established. When using the conventional methods of resistance welding, in particular in the case of contact between the cover panels and with the preheating current switched on, spillings are however created within the sandwich panel, said spillings being indicated here by arrows.

The spillings may also arise from excessively rapid heating of the plastics-material, the latter evaporating and potentially entraining liquid metal, the latter in particular emanating from the coating of the cover layers. As is illustrated in FIG. 1b), the spillings in a region 4 which is adjacent to the welding region 3 lead to localized evaporation of the plastics-material by the hot spillings such that typical welding faults such as, for example, bulges in the sandwich panel can be identified.

Figure 2B:
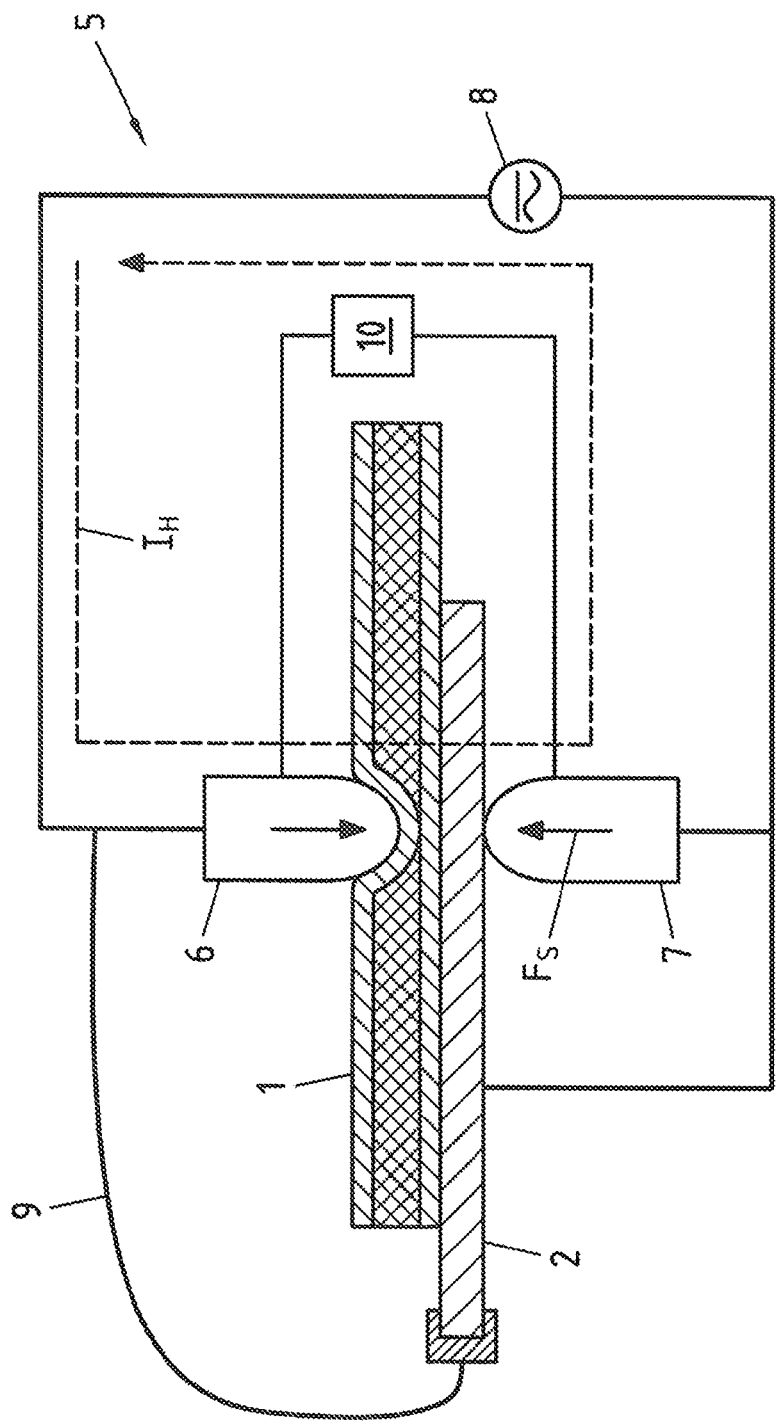
FIG. 2b is a schematic sectional view of the example device of FIG. 2a for resistance welding the sandwich panel to another metallic component, wherein a materially integral connection is formed in a boundary layer between two cover panels.
Figure 2C:
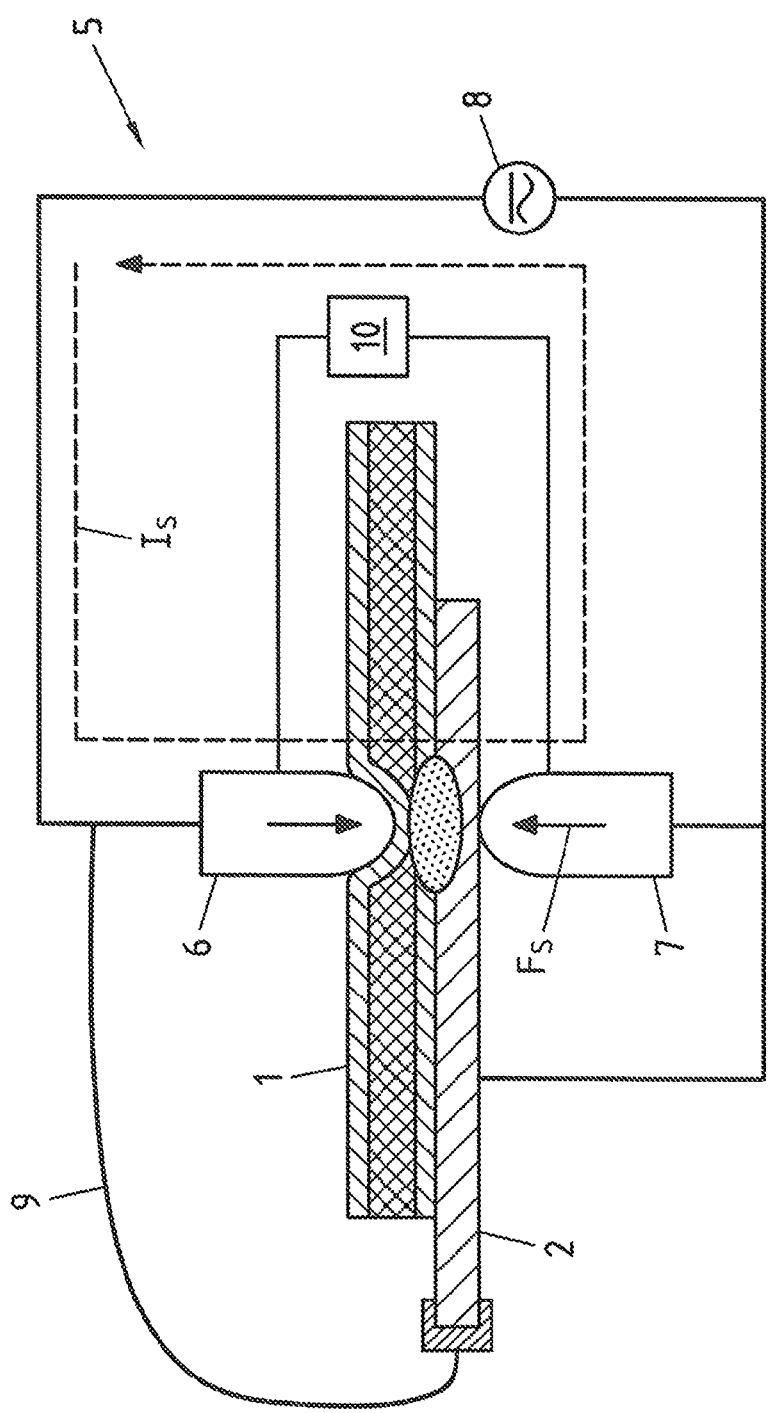
FIG. 2c is a schematic sectional view of the example device of FIGS. 2a-2b for resistance welding the sandwich panel to another metallic component, wherein the two cover panels are connected to one another and to the metallic component.

An exemplary embodiment of a device which is usable for welding sandwich panels to metallic components is schematically illustrated in FIGS. 2a to c. The device 5 for welding sandwich panels 1 to metallic components 2 first has one first and one second welding electrode 6, 7 and a preheating current $I_V$ which is provided between the two welding electrodes. The preheating current $I_V$ is generated by a current source or by a voltage source 8, respectively. The current runs from the voltage source 8 by way of a bypass 9 between the first welding electrode 6 and the metallic component 2 to be welded. On account thereof, it is guaranteed that no direct heating of the cover panels is performed, on account of which excessive input of heat is prevented and delamination of the sandwich panel may be suppressed. Once the preheating current $I_V$ has been switched on, the welding electrodes 6, 7 are pressed against one another by means of a welding force $F_S$, so as to displace the heated plastics-material from the region to the welded (FIG. 2a). Shortly before the two cover plates establish contact in the region to be welded the preheating current $I_V$ is reduced or preferably switched off, respectively, whereas the welding electrodes 6, 7 continue to be converged or pressed against one another until the cover plates are in complete contact.

Upon contact having been established between the two cover panels, a tack-welding current $I_H$ is provided by the voltage source 8, on account of which a materially integral connection may be generated in a controlled manner in the boundary layer between the two cover panels (FIG. 2b). On account of lower electrical resistance, the tack-welding current $I_H$ flows through the metallic cover layers 1a, 1c to the second electrode and only to a small part by way of the bypass 9. Upon an electrical passage having been provided in the sandwich panel by moderate input of heat, a welding current $I_S$ which melts the cover panels in the welding region is then provided, so as to connect the cover panels to one another and to the metallic component in a materially integral manner (FIG. 2c). A device for measuring electrical resistance 10, which measures the electrical resistance between the first welding electrode 6 and the second welding electrode 7 is provided in FIGS. 2a to c.

A first exemplary embodiment of the method according to the invention is illustrated in FIG. 3 by means of a process diagram with the associated schematic sectional illustrations of the sandwich panel and of the metallic component. In the diagram, the process time t is plotted on the x-axis, and the values for the preheating current $I_V$, the tack-welding current $I_H$, the welding current $I_S$, and the electrical resistance R between the first and the second welding electrode dependent on the process time t are plotted qualitatively on the y-axis.

According to the invention, welding of the sandwich panel 1 to the metallic component 2 is subdivided into three steps. In step A, that region of the sandwich panel that is to be welded is heated by a preheating current, and the plastics-material between the metallic cover layers of the sandwich panel in the welding region is displaced by applying a welding force to the first and second welding electrode such that the metallic cover layers of the sandwich panel are pressed on top of one another. In the next step B, a tack-welding current $I_H$ for generating a tack weld between the metallic cover layers of the sandwich panel flows between the welding electrodes 6, 7. Subsequently, in step C, the tack-welded metallic cover layers of the sandwich panel are welded to the component by a welding current.

As can be derived from the diagram of FIG. 3, the preheating current $I_V$ in the case of a drop in the resistance R between the both two welding electrodes 6 and 7 is heavily reduced in the method step A, and a tack-welding current $I_H$ is applied. The metallic cover layers are tack-welded to one another in the method step B such that the plastics-material remaining between the metallic cover layers is gently removed from this region without creating spillings in the sandwich panel. Moreover, a materially integral connection exists between the metallic cover layers after tack welding, such that spillings can no longer arise within the sandwich panel when the welding current $I_S$ is applied.

The welding current $I_S$ is switched on upon completion of tack welding the metallic cover layers. Switching on the welding current $I_S$ is preferably performed by way of a ramping function such that the welding current increases over time, up to reaching a maximum value. The welding current $I_S$ may again be reduced to zero once welding the metallic cover layers to the metallic component has been performed.

Additionally, the welding force F at which the two welding electrodes 6 and 7 are mutually compressed is illustrated in the diagram of FIG. 3. It can be seen that the welding force F increases during the preheating step A, reaching a maximum value when tack welding commences. The welding force F is kept at this maximum value and is only reduced to zero once the welding electrodes have been lifted from the joined sandwich panel.

The welding electrodes 6, 7 and the sandwich panel 1 and the component 2 are illustrated at the respective time points in a highly schematic illustration below the diagram. Upon having been preheated according to step A, the metallic cover layers of the sandwich panel 1 are in metallic contact such that the resistance R drops sharply. In this state, the tack-welding current $I_H$ is switched on in the method step B, generating a tack weld between the metallic cover layers of the sandwich panel. By virtue of the slighter thicknesses of the metallic cover layers of the sandwich panel, only comparatively low tack-welding currents $I_H$ are required. A comparatively high welding current $I_S$ as shown in method step C is typically required for welding the metallic cover layers to the component 2, as is also illustrated in FIG. 3. However, the tack-welding current is also variable and adaptable to the configuration of the connection partners.

Figure 4:
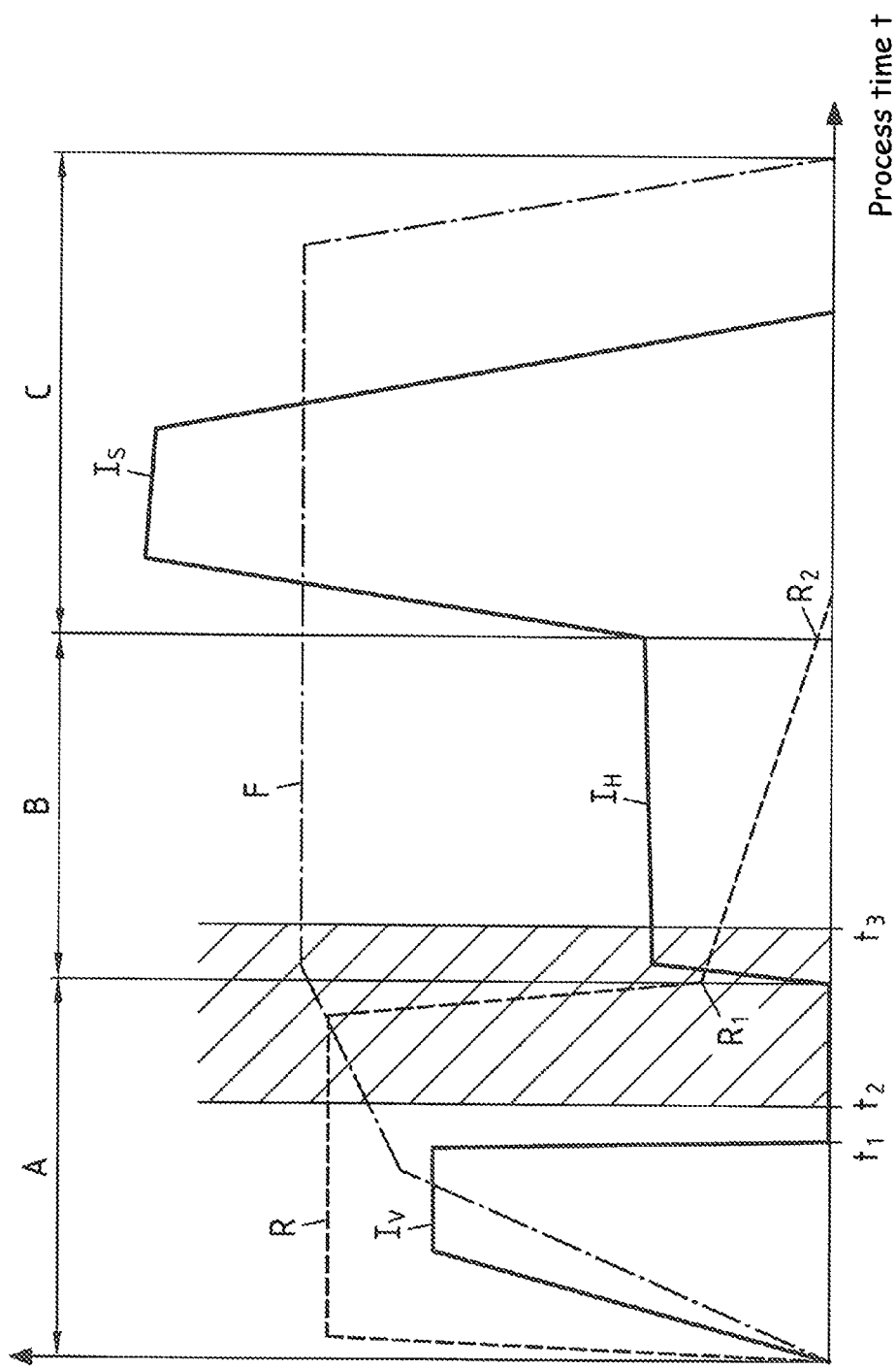
FIG. 4 is a chart similar to that in FIG. 3 that plots currents, resistance, and force against time at different periods of time during an example method of resistance welding.

In the exemplary embodiment illustrated in FIG. 4, the method steps A, B, C are likewise illustrated so as to be dependent on the process time t. In the exemplary embodiment illustrated in FIG. 4, the preheating current $I_V$ is set for a fixed time period $t_1$ such that sufficient heating is obtained and it is ensured that the preheating current $I_V$ is already switched off during the drop in the electrical resistance R between the first and second welding electrode 6, 7. Should the electrical resistance between the first and second welding electrode sink to a first predefined resistance value $R_1$, the tack-welding current $I_H$ is switched on and increased to the maximum value thereof by way of a ramping function. It is achieved by the decelerated increase in the tack-welding current $I_H$ that the risk of spillings within the sandwich panel is reduced when the metallic cover layers of the sandwich panel are tack welded. As shown in FIG. 4, as tack welding is performed during the method step B, the electrical resistance R drops further down to the second predefined resistance value $R_2$ such that the welding current $I_S$ may be switched on once the resistance value $R_2$ has been reached. It can also be seen in FIG. 4 that the welding current $I_S$ is higher than the tack-welding current $I_H$.

In order for the fixed preheating period up to the time point $t_1$ to be set, analysis of empirical tests may, for example, be utilized for establishing a process time range $t_2$ to $t_3$ in which the drop in resistance by virtue of contact between the metallic cover layers is performed with high probability. If the interval between $t_2$ and $t_3$ is defined, the time period $t_1$ may be fixedly set such that the preheating current $I_V$ is switched off as soon as the tack-welding current $I_H$ is switched on.

As a result, welding sandwich panels to metallic components 2 may be carried out in a short process time and almost with exclusion of the risk of defects being generated in the sandwich panel 1 by spillings.

What is claimed is:

1. A method for resistance welding a sandwich panel to a metallic component, wherein the sandwich panel comprises an intermediate thermoplastic plastics-material layer disposed between two metallic cover layers, the method comprising:
   heating a region of the sandwich panel to be welded with a preheating current in such a manner that the intermediate thermoplastic plastics-material layer is softened;
   compressing the two metallic cover layers of the sandwich panel so as to displace the intermediate thermoplastic plastics-material layer from the region of the sandwich panel to be welded, wherein the two metallic cover layers are compressed and pressed onto one another by using a first welding electrode and a second welding electrode to apply a welding force;
   tack welding the two metallic cover layers of the sandwich panel; and
   welding the two metallic cover layers and the metallic component together by an electric welding current flowing by way of the first and second welding electrodes, the first welding electrode being in contact with one of the two metallic cover layers of the sandwich panel and the second welding electrode being in contact with the metallic component;
   wherein the preheating current flows via a bypass between the first welding electrode and the metallic component to be welded; and
   wherein the tack-welding current is set between the first and second welding electrodes for generating a tack weld between the two metallic cover layers of the sandwich panel when the preheating current is reduced to a predefined first value or switched off.

2. The method of claim 1 further comprising:
   resistance measuring an electrical resistance between the first and second welding electrodes; and
   reducing or switching off the preheating current when the electrical resistance drops.

3. The method of claim 1 wherein the tack-welding current is less than the welding current.

4. The method of claim 1 wherein the tack-welding current is switched on when an electrical resistance between the first and second welding electrodes drops to a first predefined resistance value.

5. The method of claim 4 further comprising setting the welding current for welding the sandwich panel to the metallic component when the electrical resistance between the first and second welding electrodes reaches a second predefined resistance value.

6. The method of claim 5 further comprising holding the welding force constant when the electrical resistance between the first and second welding electrodes drops to a third predefined resistance value.

7. The method of claim 1 wherein the tack-welding current is set to a maximum value by using a ramping function.

8. The method of claim 1 wherein the welding current is set to a maximum value by using a ramping function.

9. The method of claim 1 further comprising increasing the welding force between the first and second welding electrodes at least until an electrical resistance between the first and second welding electrodes drops.

10. The method of claim 1 further comprising switching off the preheating current after a fixed preheating period.

11. A method for resistance welding a sandwich panel to a metallic component, wherein the sandwich panel comprises an intermediate thermoplastic plastics-material layer disposed between two metallic cover layers, the method comprising:

heating a region of the sandwich panel to be welded with a preheating current in such a manner that the intermediate thermoplastic plastics-material layer is softened;

compressing the two metallic cover layers of the sandwich panel by using a first welding electrode and a second welding electrode to apply a welding force so as to displace the intermediate thermoplastic plastics-material layer from the region of the sandwich panel to be welded;

tack welding the two metallic cover layers of the sandwich panel by transmitting a tack-welding current between the first and second welding electrodes; and welding the two metallic cover layers and the metallic component together by transmitting an electric welding current between the first and second welding electrodes;

wherein the preheating current flows via a bypass between the first welding electrode and the metallic component to be welded; and wherein the tack-welding current is set between the first and second welding electrodes for generating the tack weld between the two metallic cover layers of the sandwich panel when the preheating current is reduced to a predefined first value or switched off.

12. The method of claim 11 wherein the first welding electrode is in contact with at least one of the two metallic cover layers of the sandwich panel and the second welding electrode is in contact with the metallic component.

* * * * *